United States Patent
Manry

(10) Patent No.: US 11,118,684 B2
(45) Date of Patent: Sep. 14, 2021

(54) RETAINER DEVICE FOR CIRCUMFERENTIAL SHAFT SEALS

(71) Applicant: Kaydon Ring & Seal, Inc., Baltimore, MD (US)

(72) Inventor: Jared Manry, Shrewsbury, PA (US)

(73) Assignee: KAYDON RING & SEAL, INC., Baltimore, MD (US)

(*) Notice: Subject to any disclaimer, the term of this patent is extended or adjusted under 35 U.S.C. 154(b) by 666 days.

(21) Appl. No.: 15/908,109

(22) Filed: Feb. 28, 2018

(65) Prior Publication Data
US 2019/0264814 A1    Aug. 29, 2019

(51) Int. Cl.
| | |
|---|---|
| F16J 15/3248 | (2016.01) |
| F16J 15/3268 | (2016.01) |
| F16J 15/3284 | (2016.01) |
| F16J 15/3252 | (2016.01) |
| F16J 15/3212 | (2016.01) |
| F16J 15/44 | (2006.01) |

(52) U.S. Cl.
CPC ....... *F16J 15/3268* (2013.01); *F16J 15/3212* (2013.01); *F16J 15/3252* (2013.01); *F16J 15/3284* (2013.01); *F16J 15/442* (2013.01)

(58) Field of Classification Search
CPC .. F16J 15/3268; F16J 15/3276; F16J 15/3464; F16J 15/3472; F16J 15/44; F16J 15/441; F16J 15/442; F16J 15/3452; F16J 15/30
See application file for complete search history.

(56) References Cited

U.S. PATENT DOCUMENTS

| | | | |
|---|---|---|---|
| 3,024,028 A * | 3/1962 | Murphy | F16J 15/36 277/372 |
| 3,516,678 A * | 6/1970 | Stein | F16J 15/3416 277/388 |
| 5,217,232 A * | 6/1993 | Makhobey | F16J 15/164 277/411 |
| 10,385,921 B2 * | 8/2019 | Becker | F16C 33/767 |
| 2010/0066027 A1 * | 3/2010 | Vasagar | F01D 11/003 277/350 |
| 2018/0202494 A1 * | 7/2018 | Becker | F16C 33/805 |
| 2019/0017547 A1 * | 1/2019 | Garrison | F16C 32/0625 |
| 2019/0394541 A1 * | 12/2019 | Baheti | G01K 13/08 |

* cited by examiner

*Primary Examiner* — Vishal A Patel
*Assistant Examiner* — Lakshmi Susmitha Koneru
(74) *Attorney, Agent, or Firm* — J-Tek Law PLLC; Scott T. Wakeman; Mark A. Ussai

(57) ABSTRACT

A retainer device is for a seal assembly for sealing between a shaft rotatable about a central axis and a housing having a bore. The seal assembly includes at least one annular seal disposed within the housing bore and about the shaft and at least one spring for biasing the seal along the axis. The retainer device includes a generally annular body disposeable within the housing bore so as to be spaced axially from the at least one seal. The body is coupleable with the housing such that the body is generally nonrotatable about the central axis and includes at least one retainer lug extending at least generally axially from the body. The lug is engageable with the seal to prevent angular displacement of the seal about the axis. The body has at least one generally radially-extending spring contact surface contactable by an end of the at least one spring.

8 Claims, 21 Drawing Sheets

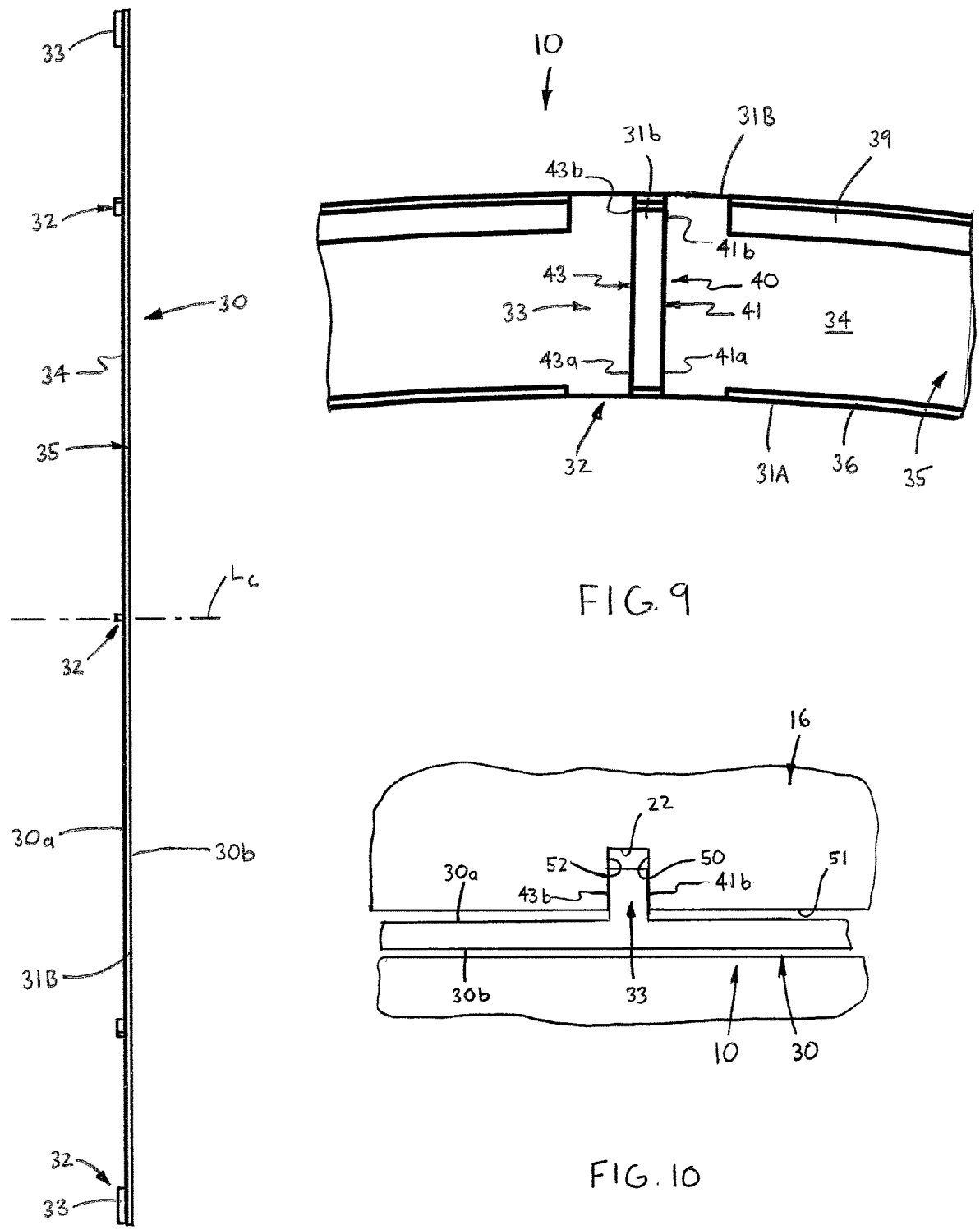

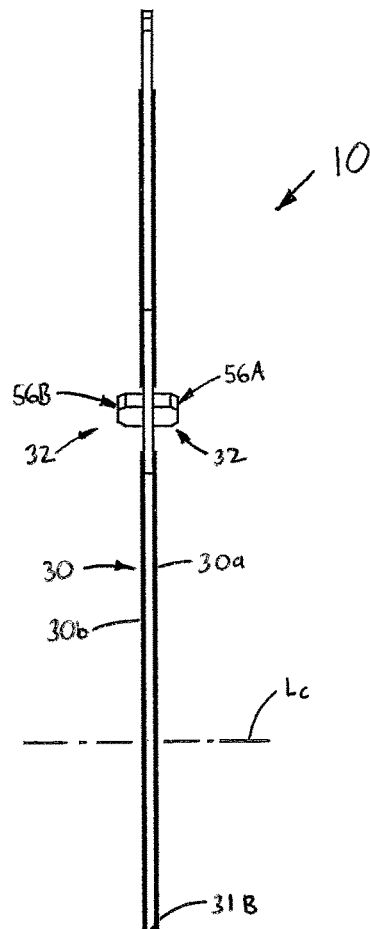
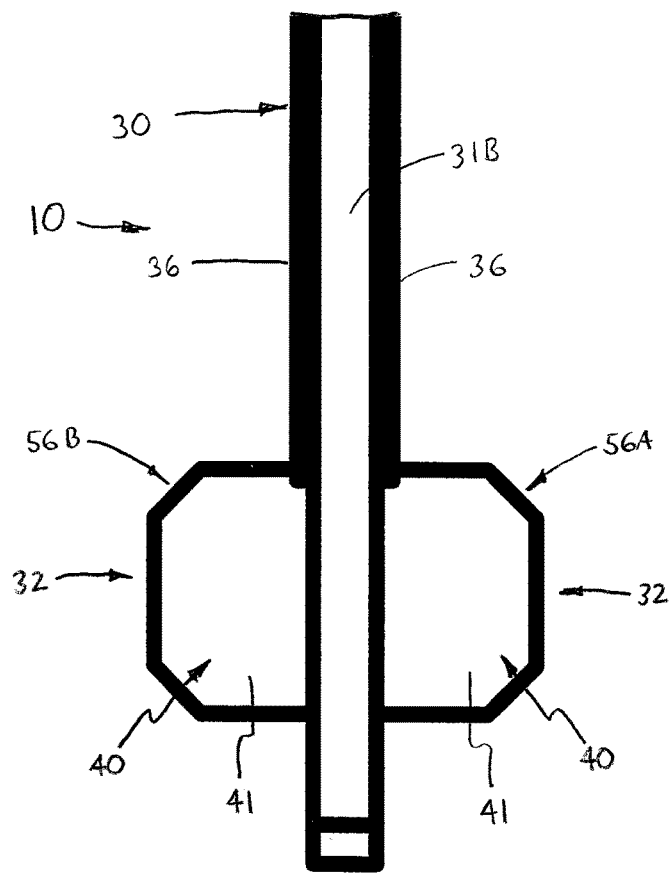
FIG. 19
FIG. 20

RETAINER DEVICE FOR CIRCUMFERENTIAL SHAFT SEALS

BACKGROUND OF THE INVENTION

The present invention relates to seal assemblies, and more particularly to devices for preventing angular displacement of circumferential seals.

Circumferential shaft seals are generally known and include an annular body disposed within a housing bore and having an inner surface that seals against a shaft or a sleeve/runner on the shaft. The seal annular body is often formed of two or more arcuate segments coupled together end-to-end and typically formed of a carbon material. The seal segments are often designed to "lift" off of the outer surface of the shaft or sleeve during shaft rotation to minimize seal wear. In order to prevent rotation of the seal with respect to the shaft axis, one or more axial pins are typically provided which have a first end attached to housing and a second end connected with a seal segment.

SUMMARY OF THE INVENTION

In one aspect, the present invention is a retainer device for a seal assembly for sealing between a shaft and a housing, the housing having a bore and the shaft being disposed within the housing bore and rotatable about a central axis. The seal assembly includes at least one annular seal disposed within the housing bore and about the shaft and at least one spring for biasing the seal along the axis. The retainer device comprises a generally annular body disposeable within the housing bore so as to be spaced axially from the at least one seal, the body being coupleable with the housing such that the body is generally nonrotatable about the central axis. The retainer body includes at least one retainer lug extending at least generally axially from the body, the lug being engageable with the seal to prevent angular displacement of the seal about the axis, and at least one generally radially-extending spring contact surface contactable by an end of the at least one spring.

In another aspect, the present invention is a mechanical assembly comprising a housing having a central bore, an inner member disposed within the bore and rotatable about a central axis, and at least one generally annular seal disposed within the housing bore and about the inner member. At least one spring is configured to bias the at least one seal generally along the axis. A retainer device includes a generally annular body having a centerline and is disposed within the housing bore so as to be spaced axially from the at least one seal. The body is coupled with the housing such that the body is generally nonrotatable about the central axis and includes at least one retainer lug extending at least generally axially from the body. The lug is engaged with the seal to prevent angular displacement of the seal about the axis. Further, at least one generally radially-extending spring contact surface is contacted by an end of the at least one spring such that the spring biases the seal axially away from the retainer body in a first direction along the axis.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 8 is a side view of the first construction retainer device;

FIG. 9 is a broken-away, enlarged view of a portion of FIG. 7;

FIG. 10 is a broken-away, enlarged view of radial cross-section of the mechanical assembly with first construction retainer device, showing a retainer lug engaged with a housing opening;

FIG. 19 is a side view of the first construction retainer device;

FIG. 20 is a broken-away, enlarged view of the lower portion of FIG. 19;

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 1:
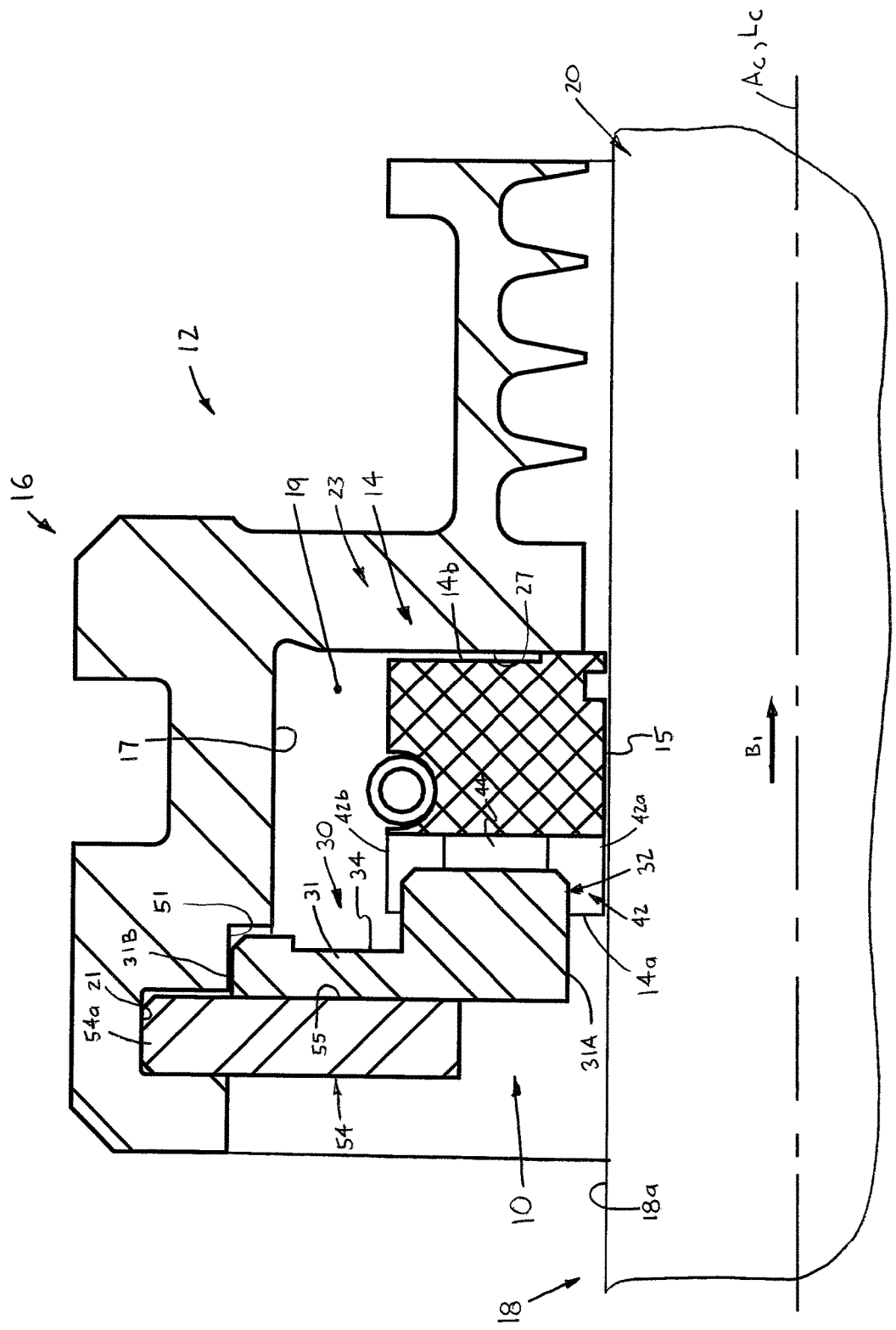
FIG. 1 is an axial cross-sectional view of a mechanical assembly including a retainer device of the present invention in accordance with a first construction, shown with a lug engaged with a single seal.
Figure 2:
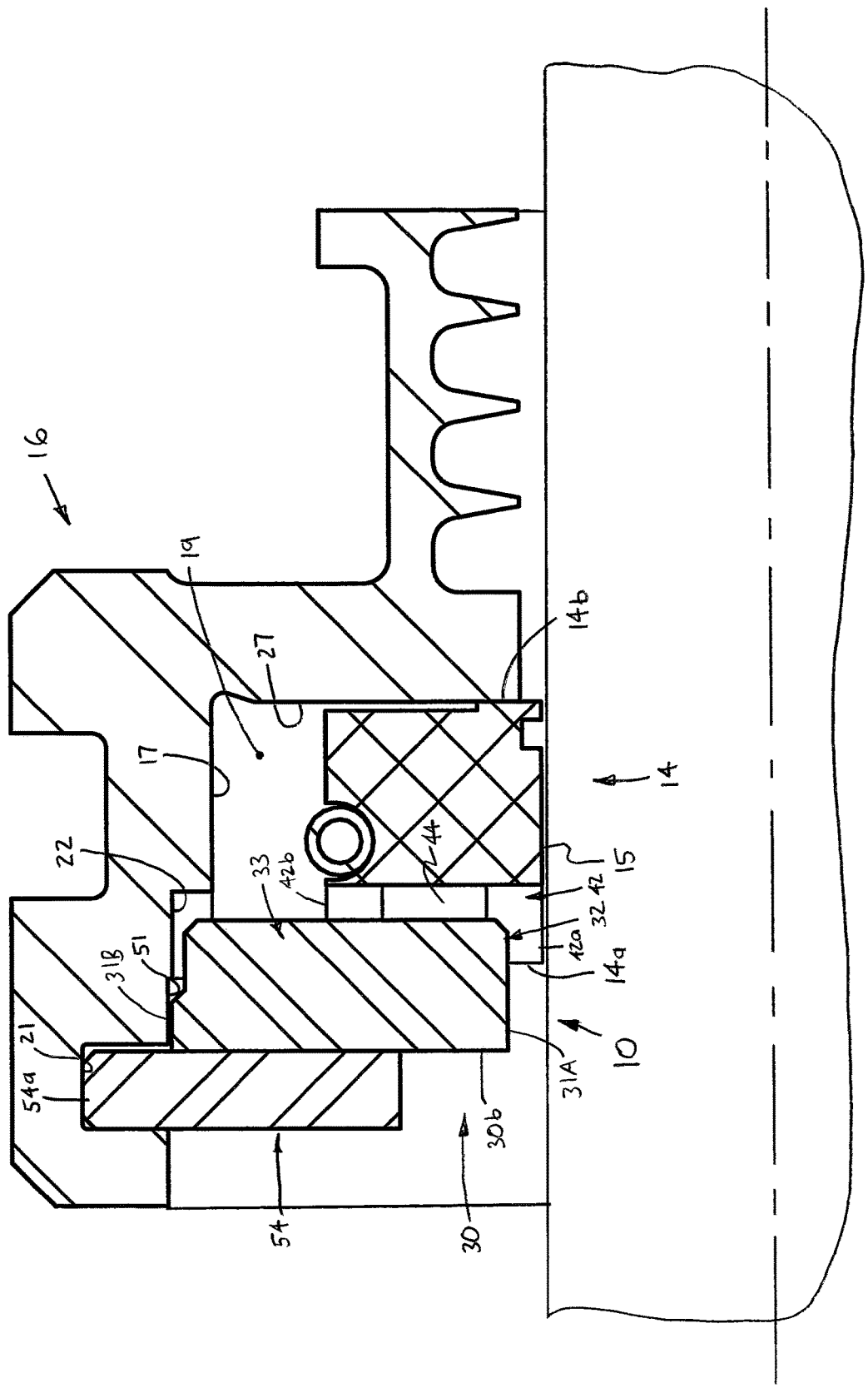
FIG. 2 is another axial cross-sectional view of the mechanical assembly with first construction retainer device, shown with a coupler lug engaged with the seal and with a housing.
Figure 3:
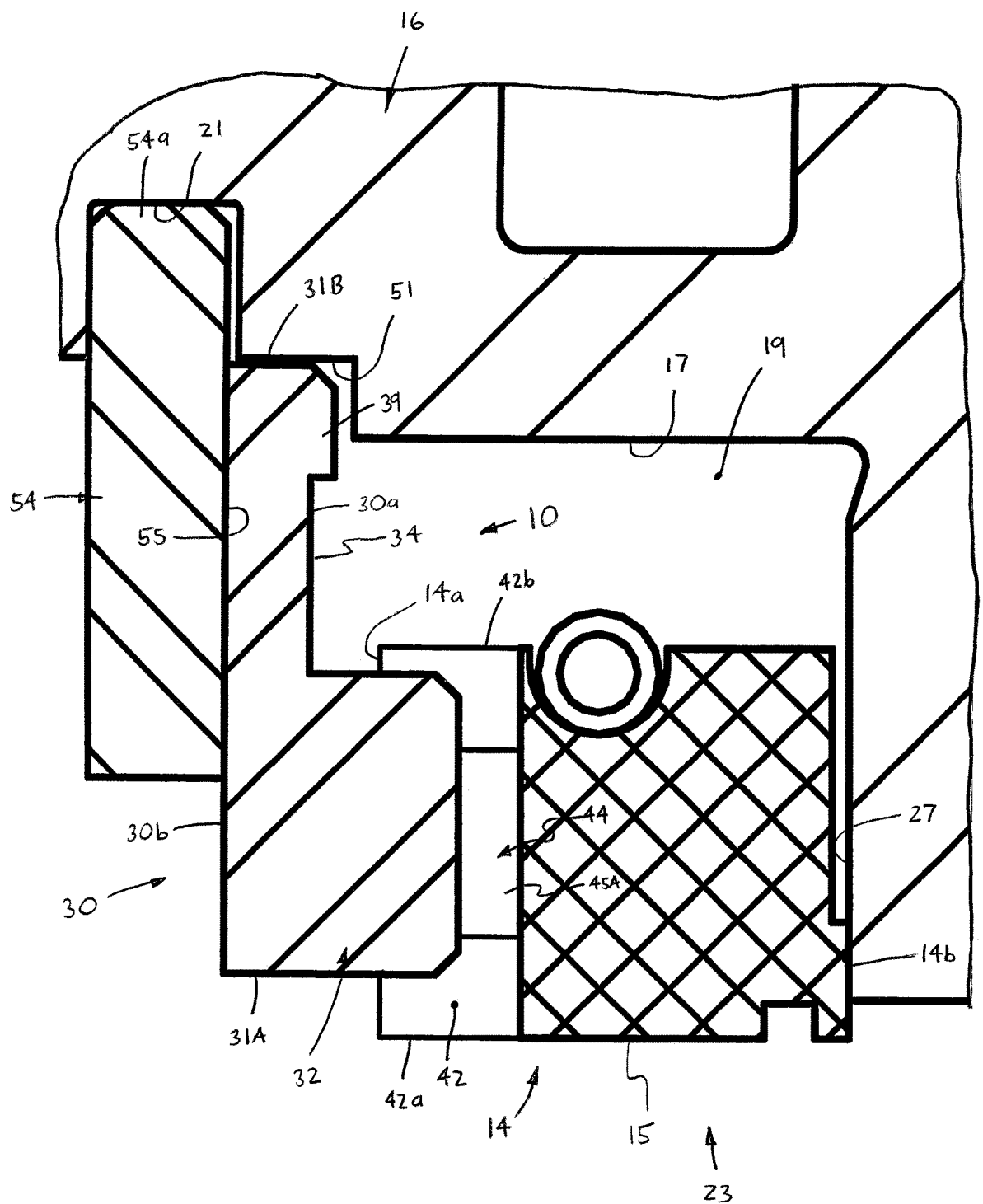
FIG. 3 is an enlarged view of a portion of FIG. 1.
Figure 4:
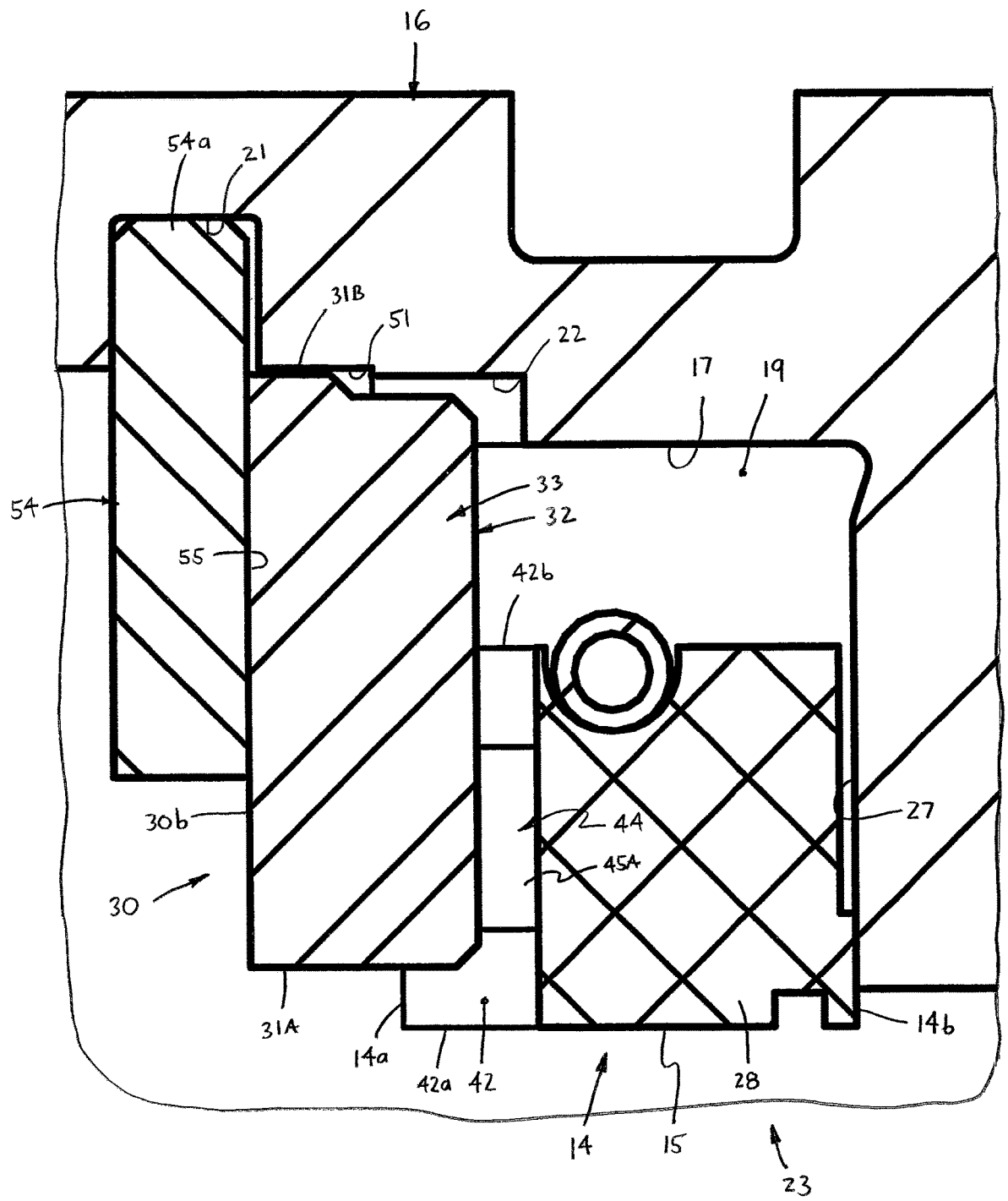
FIG. 4 is an enlarged view of a portion of FIG. 2.
Figure 5:
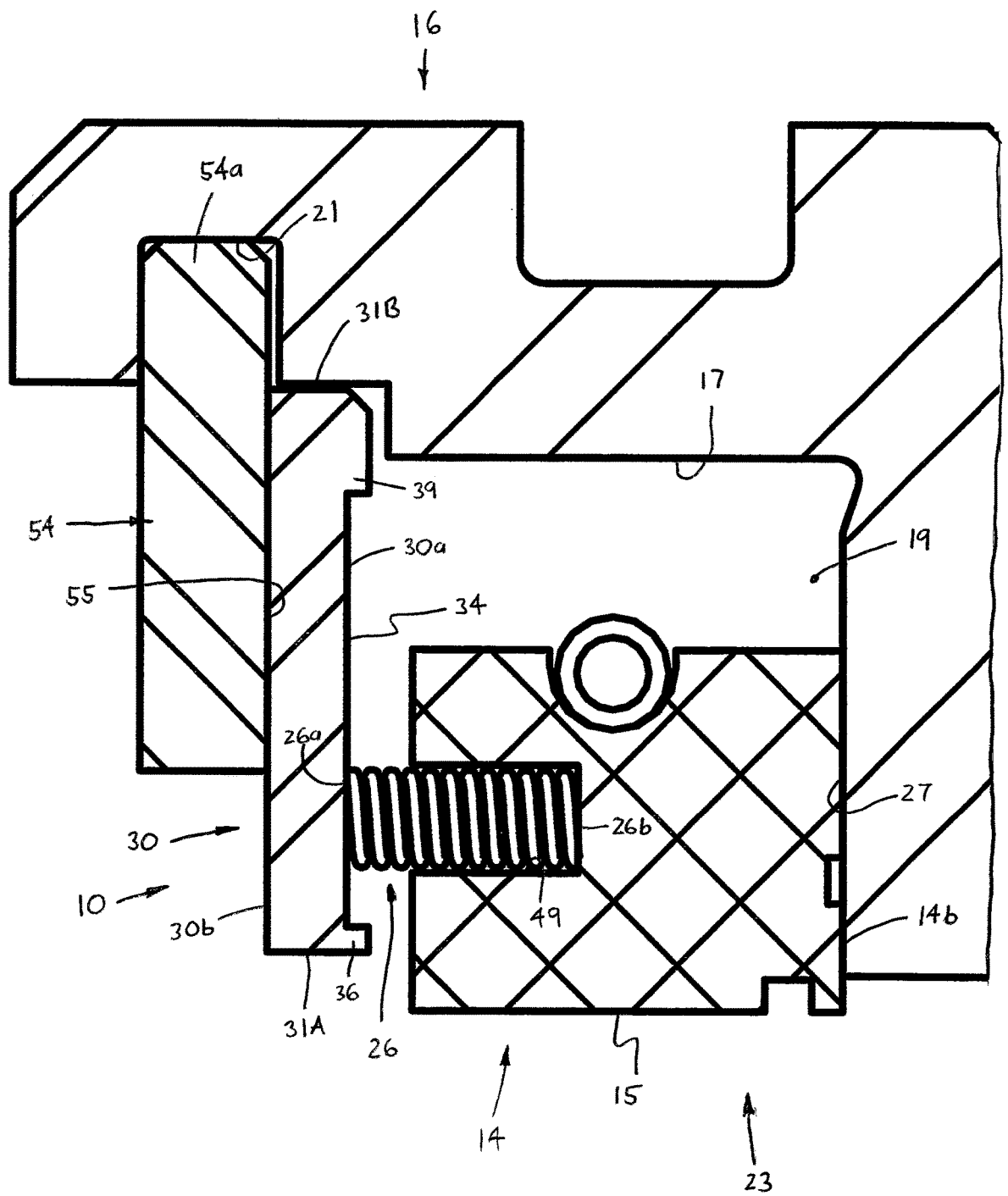
FIG. 5 is an axial cross-sectional view of the mechanical assembly with first construction retainer device, showing a spring of the assembly engaged with the retainer device.
Figure 6:
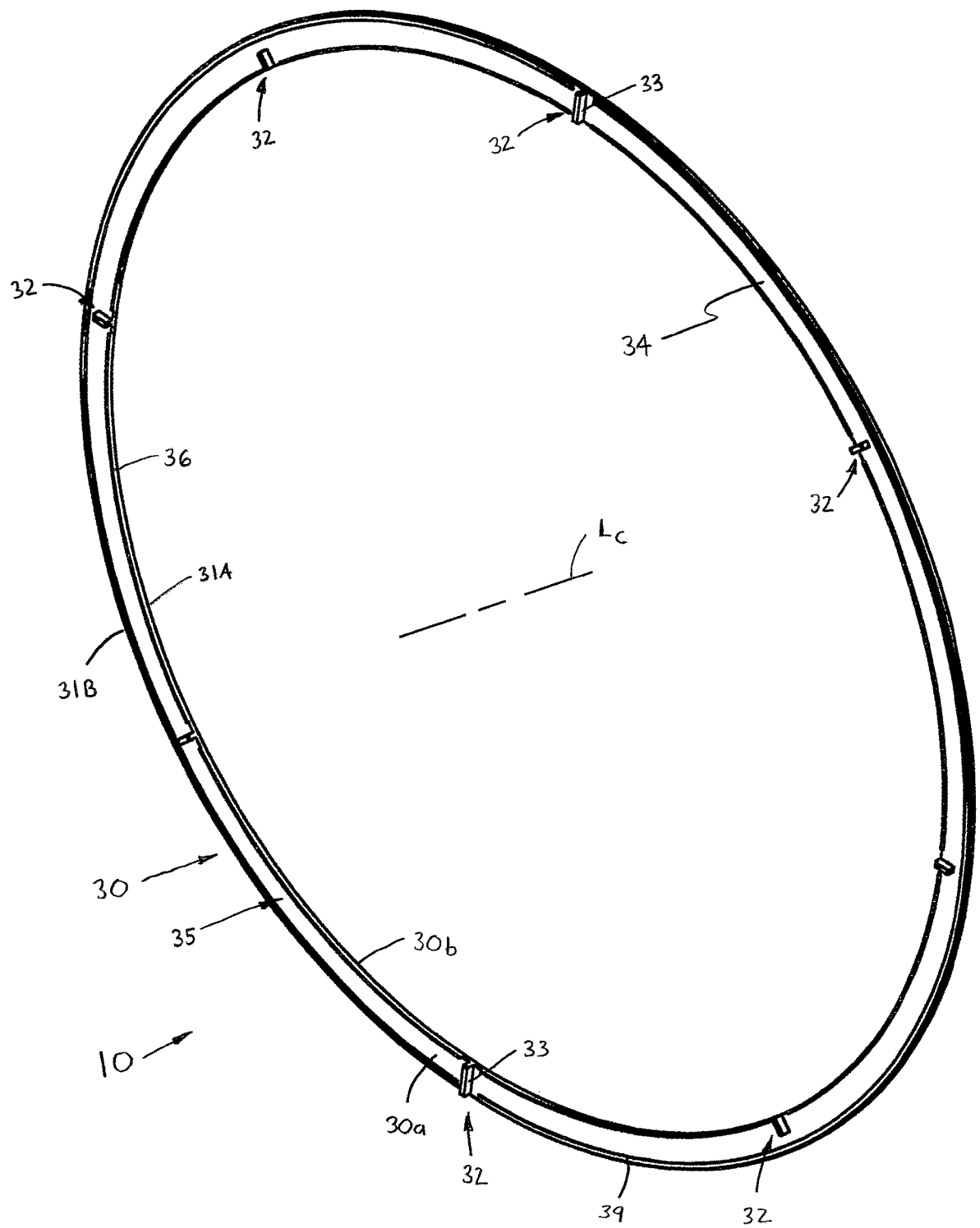
FIG. 6 is a perspective view of the first construction retainer device.
Figure 7:
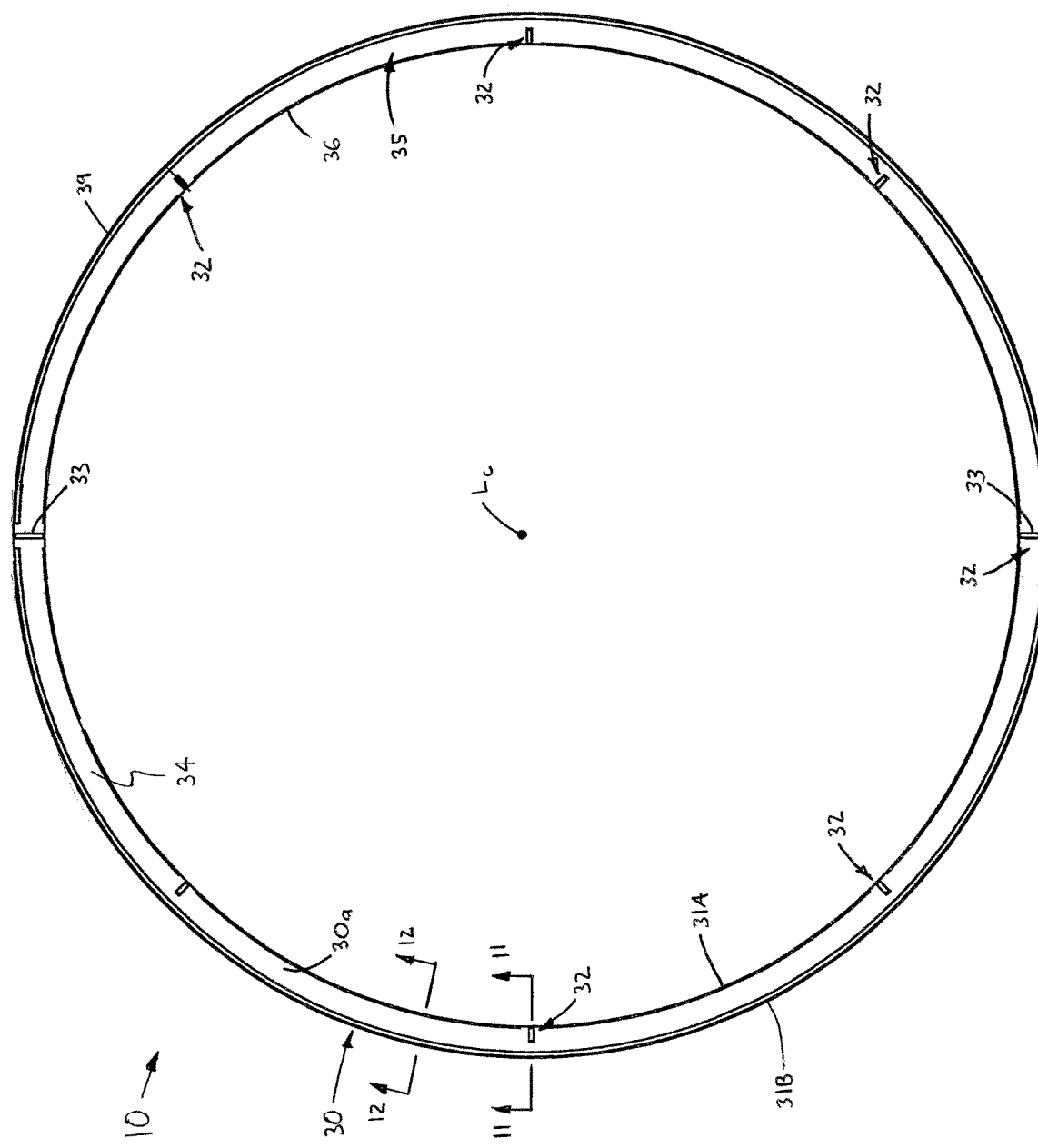
FIG. 7 is a front plan view of the first construction retainer device.
Figure 12:
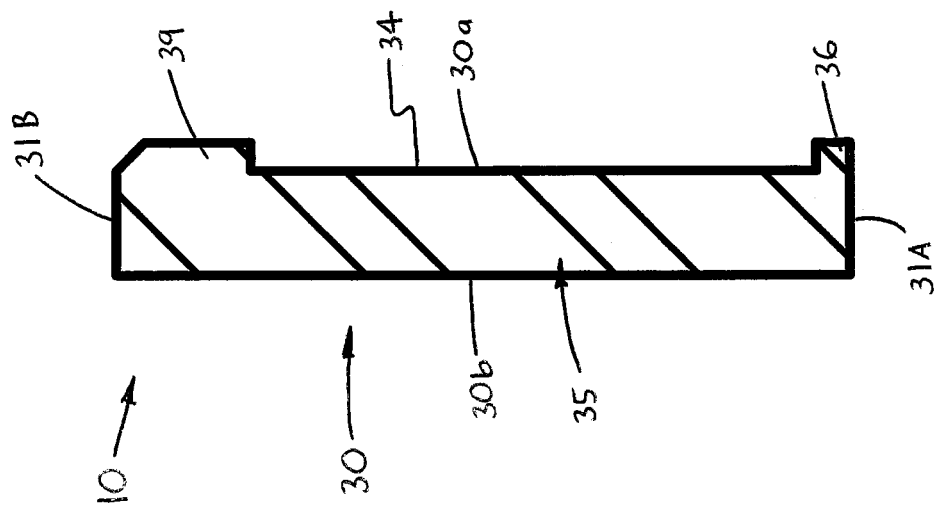
FIG. 12 is an enlarged, axial cross-sectional view of the first construction retainer device through line 12-12 of FIG. 7.
Figure 11:
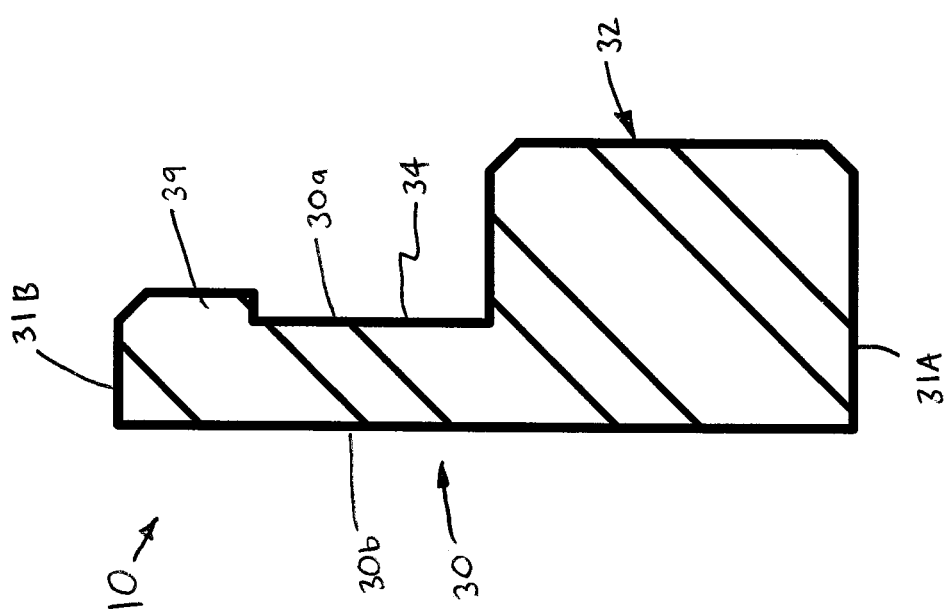
FIG. 11 is an enlarged, axial cross-sectional view of the first construction retainer device through line 11-11 of FIG. 7.

Referring now to the drawings in detail, wherein like numbers are used to indicate like elements throughout, there is shown in FIGS. 1-28 a retainer device 10 for use in a mechanical assembly 12, the device 10 preventing angular displacement of one of more seals 14 about a central axis $A_C$. The mechanical assembly 12 includes a casing or housing 16, which has an inner surface 17 defining a central bore 19 and at least one engagement opening 22 extending radially outwardly from the inner surface 17, and an inner member 18 disposed within the housing bore 19. The inner member 18 preferably includes a shaft 20, and may include one or more annular sleeves (none shown) disposed about the shaft 20, and is rotatable about the central axis $A_C$. At least one generally annular seal 14 is disposed within the housing bore 17 and about the rotatable inner member/shaft 18. The one or two seals 14 each has opposing axial ends 14a, 14b and an inner circumferential surface 15 configured to sealingly engage an outer surface 18a of the inner member 18. As shown in FIGS. 5 and 16, the mechanical assembly 12 preferably further includes at least one biasing member 26, most preferably a spring 26, configured to bias the at least one seal 14 generally along the axis $A_C$, and preferably against a radial surface 27 of the housing 16 or a component connected with the housing 16.

Figure 18:
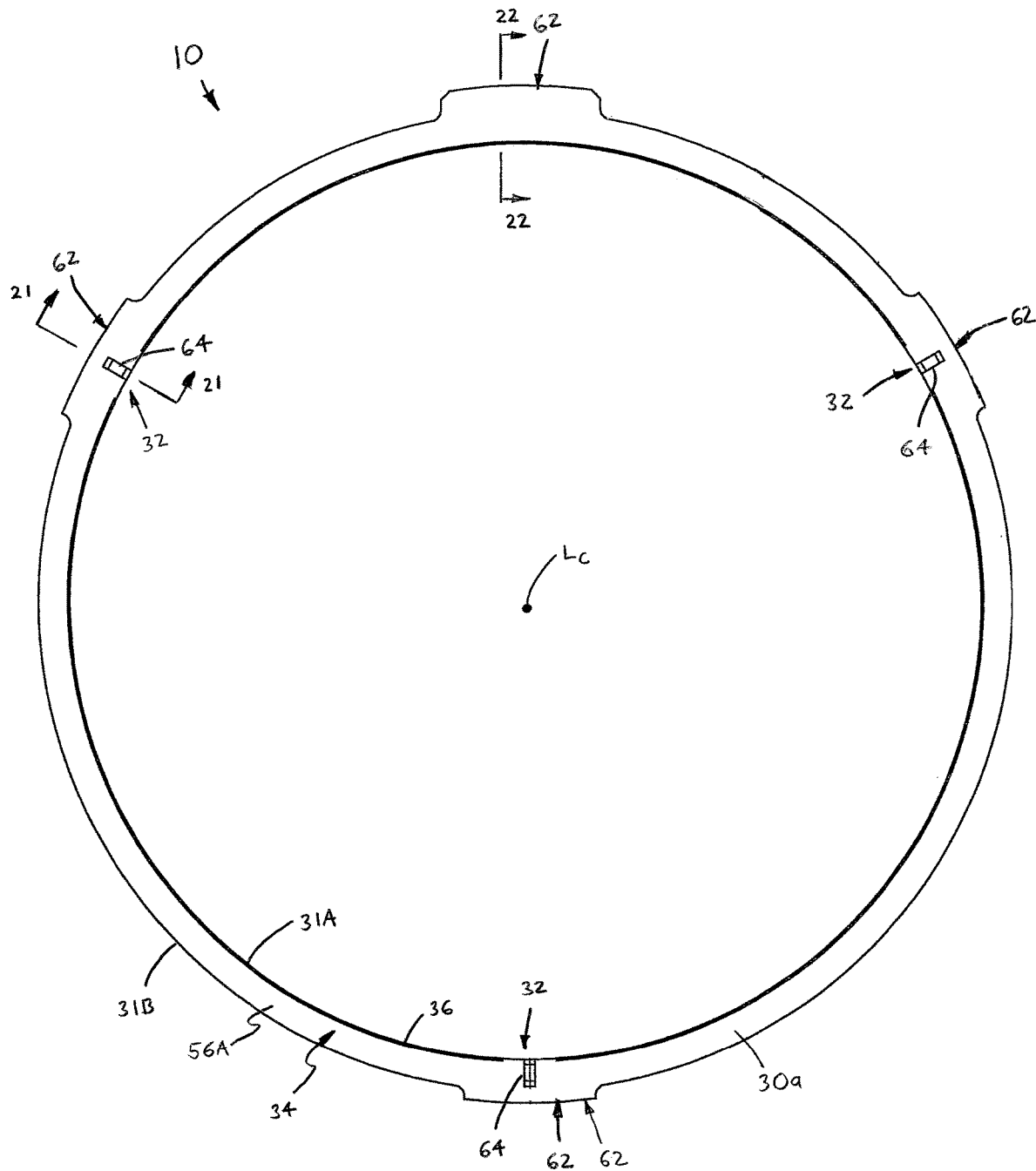
FIG. 18 is a front plan view of the second construction retainer device.
Figure 22:
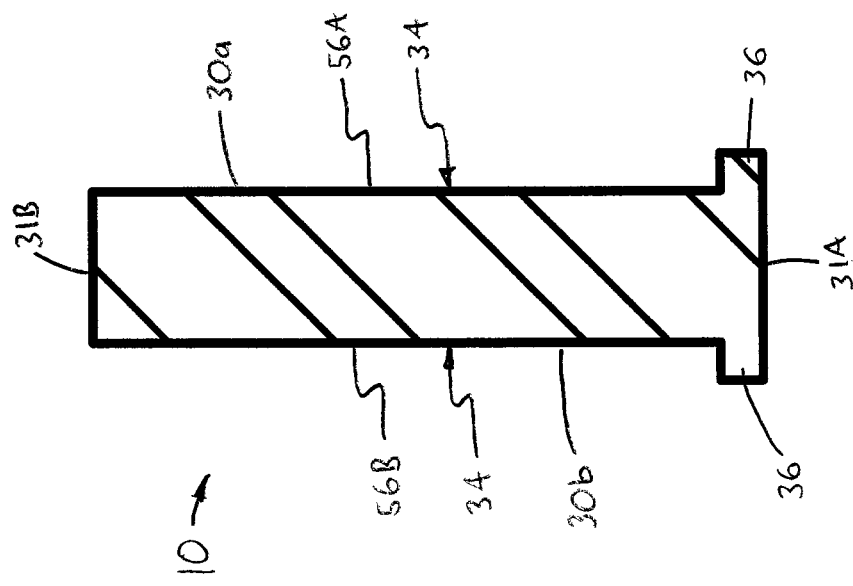
FIG. 22 is an enlarged, axial cross-sectional view of the second construction retainer device through line 22-22 of FIG. 18.
Figure 21:
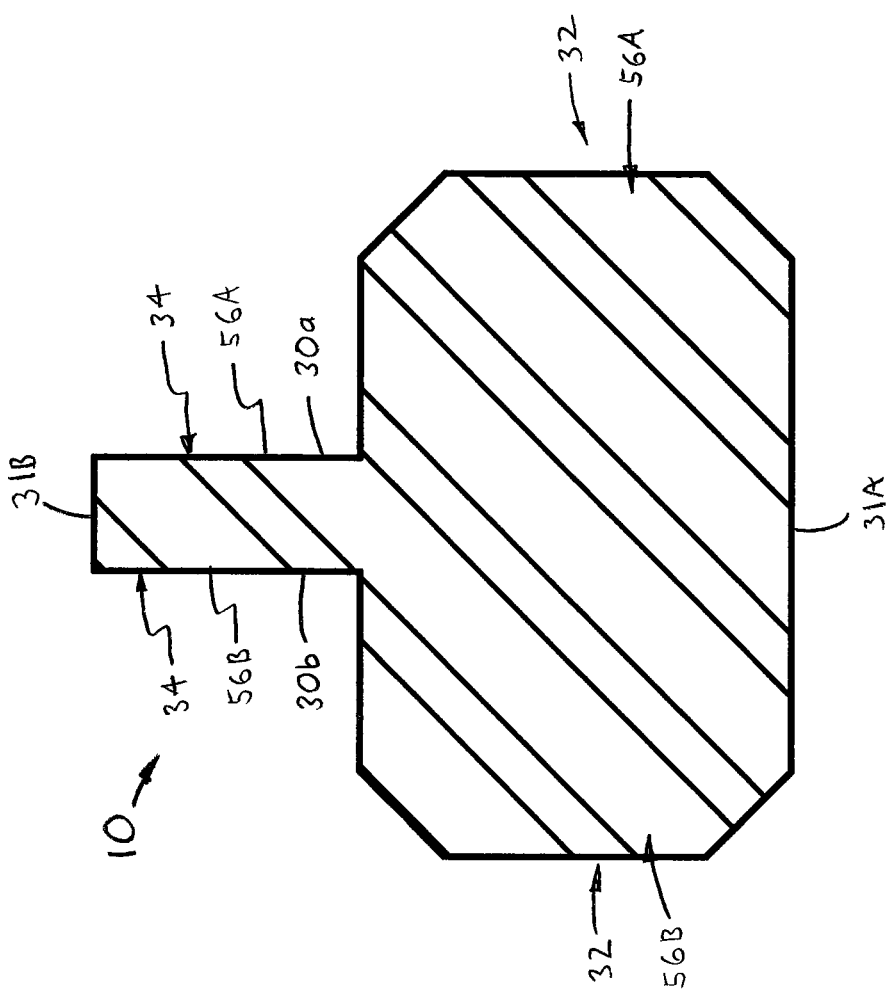
FIG. 21 is an enlarged, axial cross-sectional view of the second construction retainer device through line 21-21 of FIG. 18.
Figure 23:
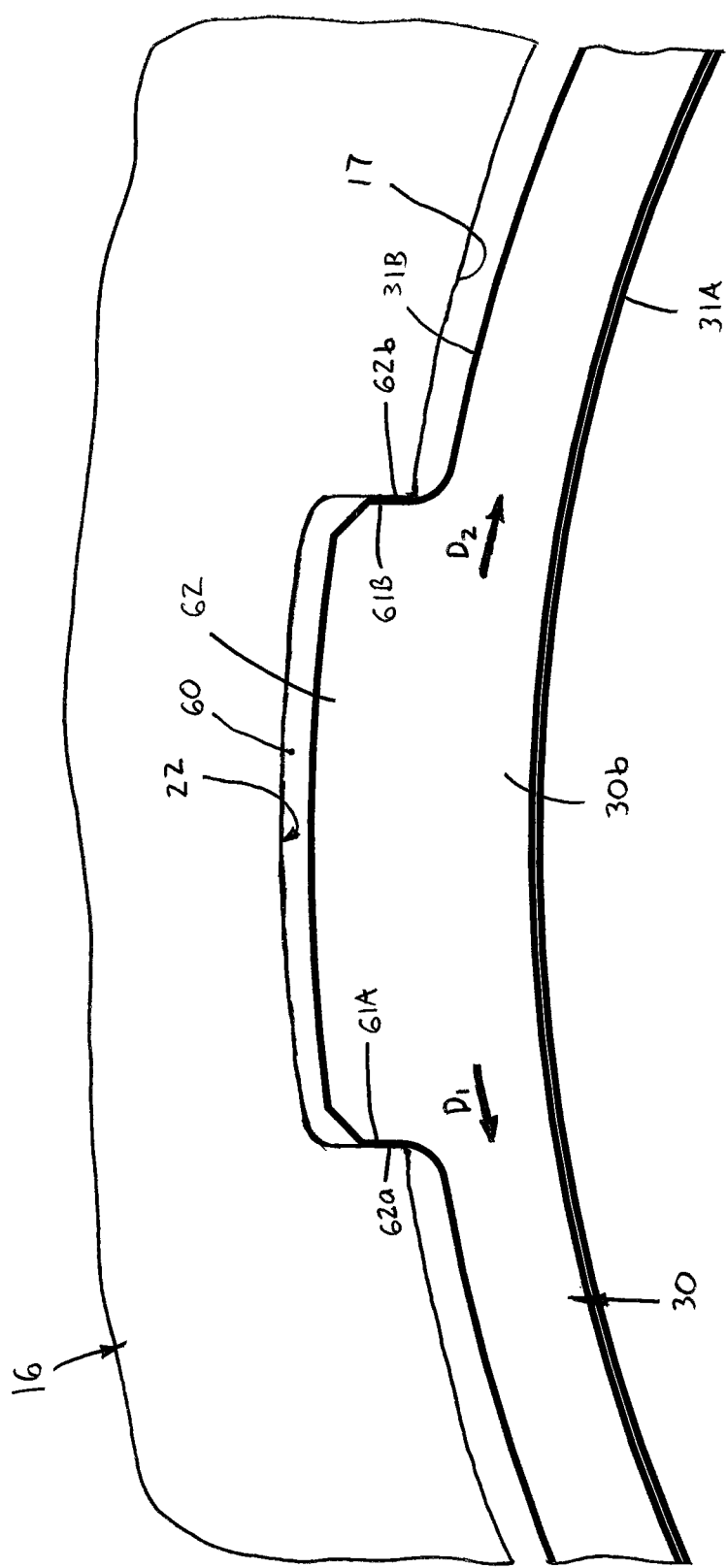
FIG. 23 is a broken-away, enlarged radial cross-sectional view of the mechanical assembly with the second construction retainer device, showing a retainer tab engaged with a housing opening.

Further, the retainer device 10 basically includes a generally annular body 30 coupled/coupleable with the housing 16 and at least one and preferably a plurality of retainer lugs 32. The one or more retainer lugs 32 are engaged (or engageable) with the seal(s) 14 to prevent angular displacement of each seal 14 about the axis $A_C$, as described in detail below. The annular body 30 has a centerline $L_C$, opposing axial ends 30a, 30b and inner and outer radial ends 31A, 31B, respectively. The retainer body 30 is disposed within the housing bore 17 so as to be spaced axially from the at least one seal 14, with the body centerline $L_C$ being at least generally collinear with the central axis $A_C$. As mentioned above, the retainer body 30 is coupleable or coupled with the housing 16 such that the body 30 is generally nonrotatable (i.e., angularly fixed) about the central axis $A_C$, as described in further detail below. Preferably, the annular body 30 includes a generally annular plate 35 with an axial thickness (i.e., between the ends 30a, 30b) that is substantially lesser than its radial thickness (i.e., between the inner and outer ends 31A, 31B), as best shown in FIGS. 8 and 18. However, the annular body 30 may alternatively be formed having a substantially greater axial thickness, such as for example, having generally rectangular axial cross-sections or relatively "thicker" cross-sections of any other appropriate shape.

Additionally, the annular body 30 further has at least one generally radially-extending spring contact surface 34 contactable/contacted by an axial end 26a of the at least one spring 26. As such, the spring(s) 26 pushes against the retainer body 30 to bias the at least one seal 14 generally axially away from the retainer body 30 in a first direction along the axis, and preferably against the radial surface 27 as discussed above. Preferably, the mechanical assembly 10 includes a plurality of springs 26 spaced circumferentially about the central axis $A_C$, each one of the springs 26 extending between the retainer body contact surface 34 and the at least one seal 14. Thereby, the biasing force applied by the springs 26 on the seal 14 is balanced to prevent cocking of the seal 14 with respect to the axis $A_C$.

Further, to prevent disengagement of the spring(s) 26 from the contact surface 34 during radial movement of the seal 14, the retainer annular body 30 preferably includes at least a lower retainer lip 36, preferably formed as a plurality of arcuate segments. The retainer lip 36 extends axially outwardly from the spring contact surface 34 and is located at least generally adjacent to the body inner radial end 31A. As such, the lip 36 prevents the end 26a of the spring 26 from sliding radially-inwardly off of the contact surface 34. Furthermore, in certain retainer constructions as shown in FIGS. 2, 3, 5-9, 11 and 12, the retainer body 30 also includes an upper retainer lip 39 located adjacent to the body outer radial end 31B and extending axially from the spring contact surface 34 to prevent the one or more springs 26 from sliding outwardly off of the contact surface 34.

Figure 26:
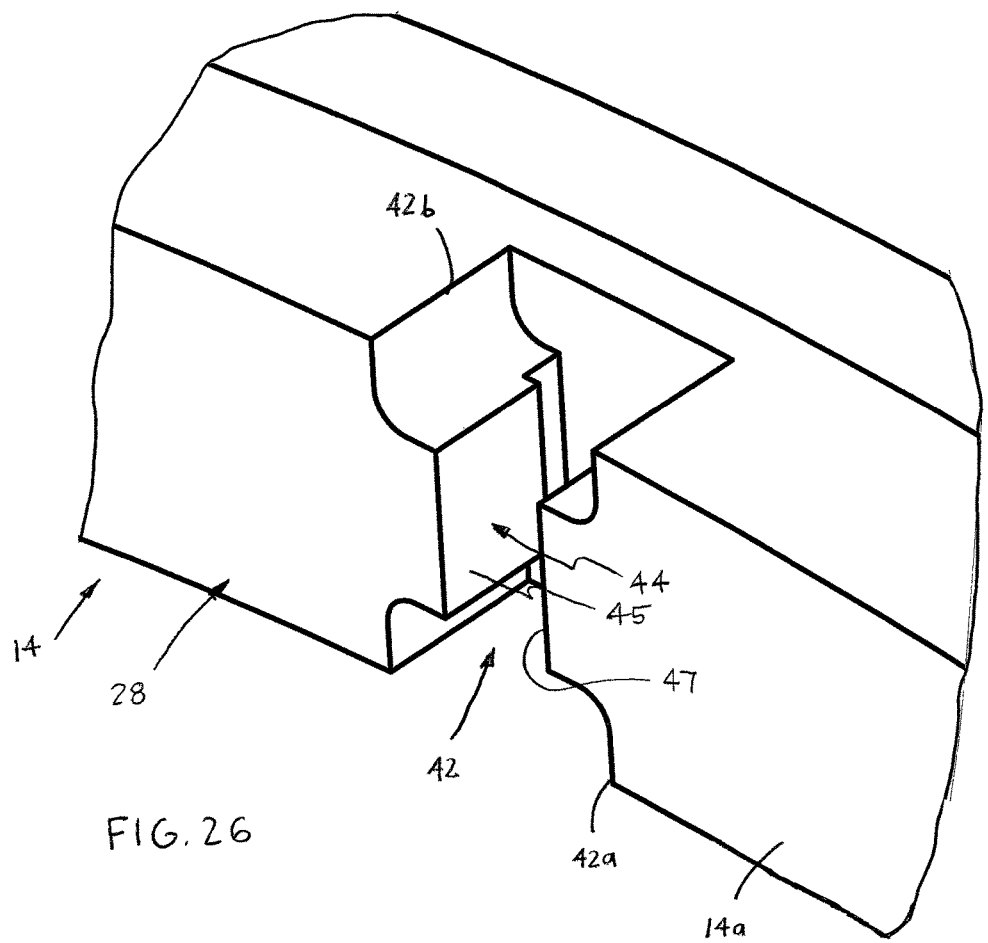
FIG. 26 is a broken-away, enlarged perspective view of a portion of the seal segment, showing a seal coupler opening.
Figure 27:
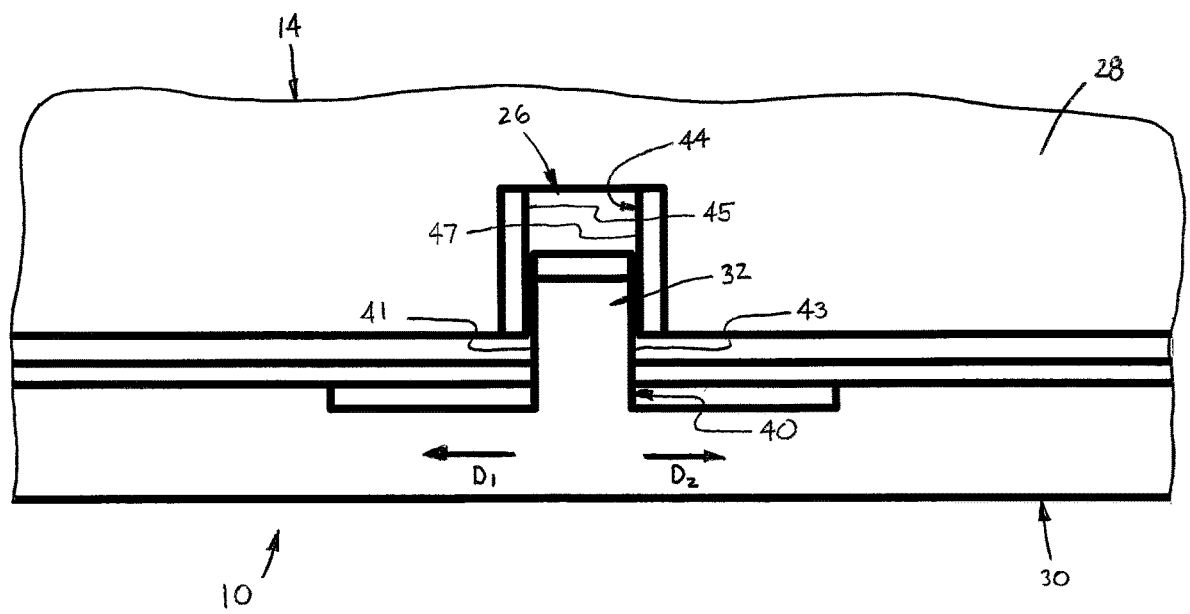
FIG. 27 is a broken-away, enlarged bottom view of the mechanical assembly with first construction retainer device, showing a lug engaged with a single seal.
Figure 28:
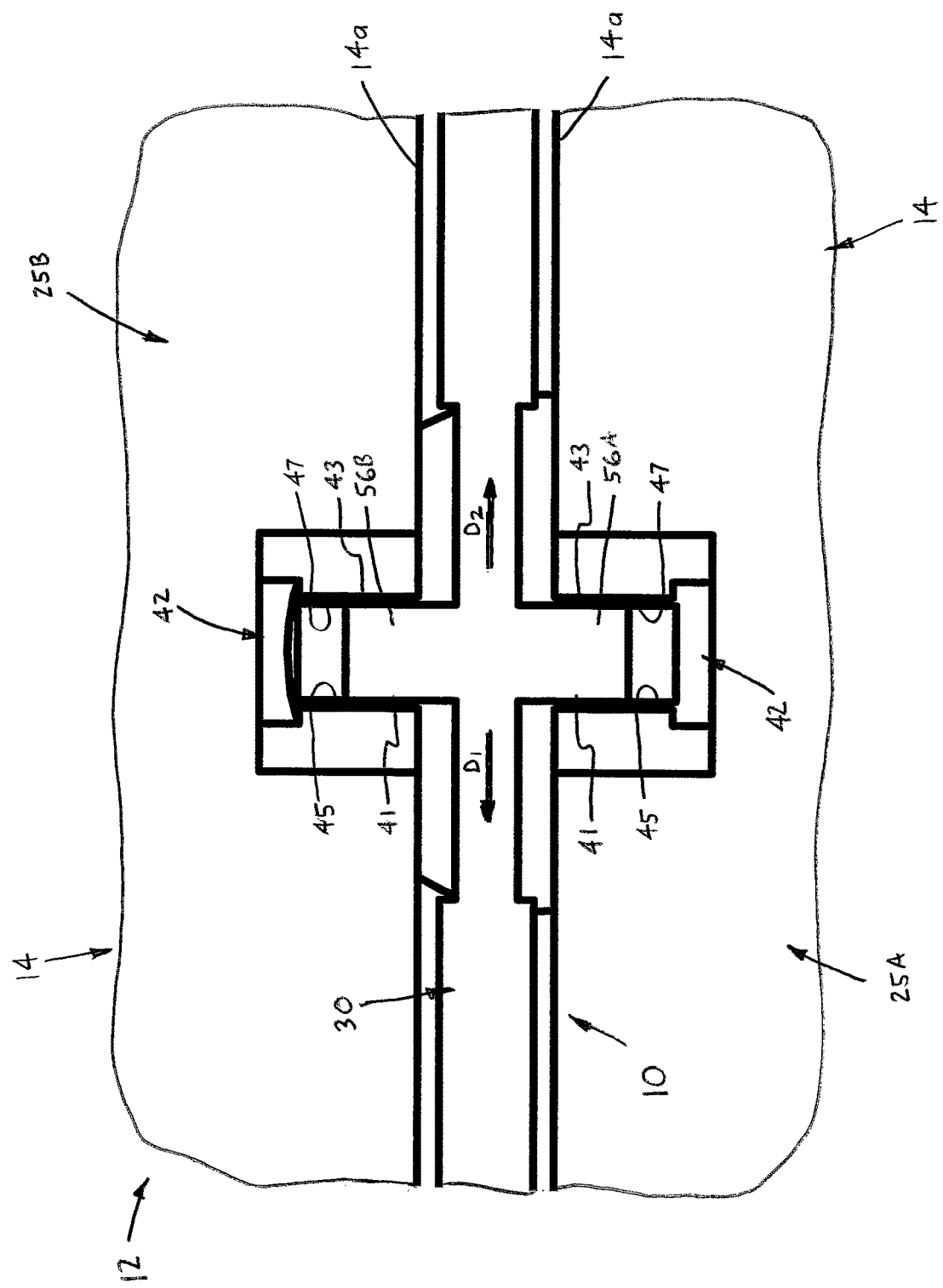
FIG. 28 is a broken-away, enlarged bottom view of the mechanical assembly with second construction retainer device, showing two lugs each engaged with separate seal of a tandem seal assembly.

Referring to FIGS. 1-4, 5-11, 13, 15, 17-21, 27 and 28, each of the one or more retainer lugs 32 extends at least generally axially from the annular body 30 and includes at least one generally radially-extending retention surface 40 (indicated in FIGS. 9, 27 and 28). The retention surface(s) 40 is/are contactable by the at least one seal 14 to prevent angular displacement of the seal 14 about the central axis $A_C$. More specifically, the at least one seal 14 has at least one and preferably a plurality of coupler openings 42, one for each lug 32 as discussed below, extending generally axially inwardly from one of the seal axial ends 12a or 12b. Each coupler opening 42 is defined at least partially by a radial engagement surface 44, and preferably by at least two facing radial surfaces 45, 47, as best shown in FIGS. 26-28. Each retainer lug 32 is disposed at least partially within a separate one of the seal coupler openings 42 such that the lug radial retention surface 40 contacts the seal radial engagement surface 44. Thereby, the interaction between the seal engagement surface 44 and the lug retention surface 40, provided by each lug 32 that is angularly fixed by the coupling of the annular body 30 with the housing 16, substantially prevents any angular displacement of the seal 14 about the central axis $A_C$.

Preferably, each lug 32 has generally rectangular cross-ssections and has two opposing radial surface sections 41, 43 providing the at least one retention surface 40, as best shown in FIGS. 27 and 28. With the preferred structures of the retainer lug 32 and the seal coupler opening 42, engagement of the facing lug/seal surface pairs 41/45 and 43/47 each prevent angular displacement in one angular direction $D_1$, $D_2$, respectively. That is, any biasing in the first angular direction $D_1$ is prevented from angular displacing the seal 14 by contact between the lug surface section 41 and seal opening surface 45 and any biasing in the second angular direction $D_2$ is prevented from angular displacing the seal 14 by contact between the lug surface section 43 and seal opening surface 47. Further, each seal coupler opening 42 preferably has open lower and upper ends 42a, 42b, respectively, such that each seal 14 is freely radially displaceable with respect to the retainer device 10. That is, each seal 14 may displace radially, for example due to lift generated in one or more ramps on the inner surface 15, as discussed in further detail below, or caused by radial movement ("runout") of the shaft 20. As such, the coupler opening surfaces 45, 47 slide radially against the lug surfaces 41, 43, respectively, during relative radial displacement of the seal(s) 14.

Although the retainer lugs 32 and seal openings 42 are formed as described above, the lug(s) 32 and/or the coupler opening 42 may be formed with each having only a single surface that engages the surface of the other component, such as for example, a lug 32 with a circular cross-sections and a correspondingly shaped coupler opening 42, or with three or more engaging surfaces, such as a hexagonal lug 32 and hexagonal opening 42. Further, for example, the lug(s) 32 may be formed as a cylindrical projection (not shown) disposed within a blind hole in the seal 14, particularly if no relative radial displacement between retainer 10 and seal 14 is desired. It is within the scope of the present invention to form the lugs 32 and/or the seal openings 42 in any other appropriate manner that enables the retainer device 10 to function as generally described herein.

Figure 24:
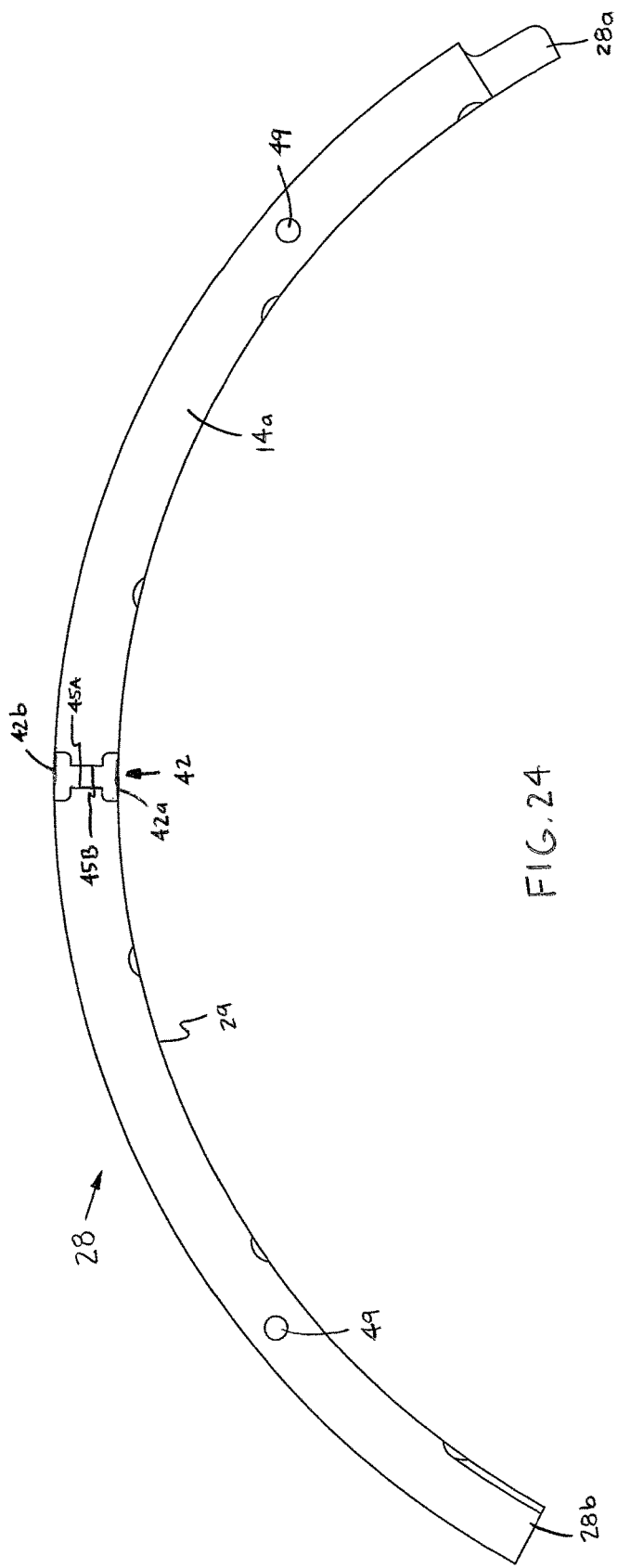
FIG. 24 is a side plan view of a seal segment of a seal.
Figure 25:
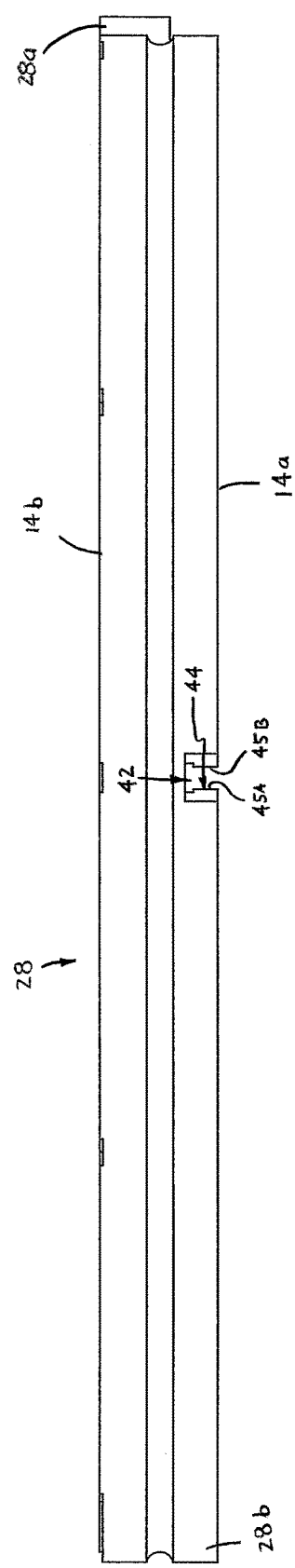
FIG. 25 is a top plan view of the seal segment.

Referring to FIGS. 24 and 25, each seal 14 preferably includes a plurality of generally arcuate seal segments 28, each seal segment 28 having two opposing ends 28a, 28b each coupled with a separate end 28b, 28a, respectively, of each adjacent segment 28 to form the annular seal 14. The segments 28 are preferably formed of a carbon material, but may be formed of any other appropriate type of material. Each segment 28 has an inner circumferential surface 29, which collectively provide the seal surface 15 as discussed above, and preferably includes at least one lift ramp (not shown) and at least one axial supply passage (not indicated) for directing fluid into at least one ramp. Each ramp extends radially outwardly from the segment inner surface 29 and is configured to generate a radially-outwardly directed lift force on the segment 28 such that each segment 28 is spaced radially outwardly from the inner member 18 during dynamic operating conditions. As best shown in FIG. 24, each segment 28 preferably includes at least one and most preferably two circular spring openings 49 extending axially inwardly from the seal first end 14a for receiving an end 26b of each spring 26, as shown in FIGS. 5 and 16.

Preferably, each arcuate seal segment 28 has one coupler opening 42 formed as described in detail above, and the retainer device 10 has a plurality of the lugs 32 corresponding to the number of seal segments 28, e.g., three lugs 32 when the seal 14 includes three arcuate segments 28, etc. Each lug 32 extends axially from the annular body 30 and the plurality of lugs 32 are spaced circumferentially about the body centerline $L_C$. Further, the retainer lugs 32 are positioned about the perimeter of the annular body 30 so as to be located to be disposed/disposeable within a separate one of the coupler openings 42 of the plurality of seal segments 28.

However, the seal 14 may alternatively be formed with one or more of the segments 28 each having two or more coupler openings 42, with only certain segments 28 having one or more coupler openings 42 or even just one segment 28 having openings 42, with the retainer device 10 having lug(s) 32 formed and located as necessary to engage with the particular seal opening(s) 42. Further, each seal 14 may alternatively be formed of only two segments 28 or even as a solid annular ring (neither shown), with the retainer lugs 32 formed to engage the specific seal structure.

Referring now to FIGS. 1-12 and 27, in a first preferred construction of the retainer device 10, which is preferably used with a single seal assembly 23, each housing opening 22 is generally rectangular and has facing, generally axially-extending surface sections 50, 52, as indicated in FIG. 10. Preferably, the housing 16 has an annular groove 51 extending radially outwardly from the inner surface 17, the retainer body outer end 31B is disposed within the groove 51 and each coupler opening 22 extends axially from the groove 51. Also, at least one and preferably two of the lugs 32 are "dual purpose" coupler lugs 33 that engage with the seal 14 and also have an outer radial end 33b disposeable within a separate one of the housing openings 22 to couple the body 30 with the housing 16. More specifically, each dual purpose coupler lug 33 is generally rectangular and extends both axially from the retainer body first axial end 30a and generally radially between the body inner radial end 31A and the body outer radial end 31B.

With the preferred lug 32 having opposing surfaces 41, 43, each lug surface 41, 43 has a radially-inner surface section 41a, 43a engageable with respective seal surfaces 45, 47 and a radially-outer surface section 41b, 43b engageable with a separate one of the surface sections 50, 52, respectively, of the housing opening 22. Thereby, engagement of one pair of facing lug and housing surface sections 41b, 50 prevents angular displacement of the retainer 10 in the first angular direction $D_1$ and engagement of the other pair of facing lug/housing surface sections 43b, 52 prevents angular displacement of the retainer 10 in the second, opposing angular direction $D_2$.

Further, the remaining lugs 32 engage only with the seal 14 and are generally formed with a relatively lesser radial length than the coupler lugs 33, each extending radially from adjacent to the body inner radial end 30a to about midway between the body inner and outer radial ends 30a, 30b. Although the retainer device 10 is preferably formed with only certain lugs 32 being dual purpose coupler lugs 33, the retainer device 10 may alternatively be formed with all lugs 32 engageable with the housing 16 or with only a single lug 32 engaged or engageable with a single housing opening 22. Furthermore, with the first construction retainer 10, the mechanical assembly 12 preferably further comprises a backing ring 54 having an upper end 54a engaged with an annular groove 21 in the housing 16 and having a radial support surface 57. The second axial end 30b of the retainer body 30 is disposed generally against the backing ring support surface 57 so as to support and balance axial loading on the retainer 10 (e.g., from the springs 26).

Referring to FIGS. 13-23 and 28, a second preferred construction of the retainer device 10 is preferably used with a "tandem" seal assembly 24 including two seals 14, specifically a first annular seal 25A and a second annular seal 25B spaced axially from the first seal 25A. The retainer body 30 is disposed axially between the first and second seals 25A, 25B and has two spring contact surfaces 34, specifically a first spring contact surface 56A on the body first axial end 30a and a second spring contact surface 56B on the body second axial end 30b. The mechanical assembly 12 includes at least one and preferably a plurality of first springs 57 extending between the first seal 25A and the retainer body 30 and at least one and preferably a plurality of second springs 58 extending between the second seal 25B and the retainer body. Each first spring 57 has an end 57a contacting the retainer first contact surface 56A and an opposing end 57b coupled with the first seal 25A, the spring(s) 57 biasing the seal 25A in the first axial direction $B_1$ against a first housing radial surface 59A. Similarly, each second spring 58 has an end 58a contacting the retainer second contact surface 56B and an opposing end 58b coupled with the second seal 25B, the spring(s) 58 biasing the seal 25B in the second axial direction $B_2$ against a second housing radial surface 59B.

In the second retainer construction, the retainer body 30 preferably has two lower retainer lips 36 each extending axially from each body axial side 30a, 30b adjacent to the body inner radial end 31A, and preferably does not have any upper retainer lips. Also, the second construction retainer lugs 32 preferably do not engage with the housing 16 and the retainer device 10 is instead provided with at least one separate tab 62 to couple the body 30 with the housing 16, and preferably a plurality of tabs 62 in order to center the retainer device 10 about the axis $A_C$. Specifically, each housing engagement opening 22 is preferably formed as an elongated slotted opening 60 and the retainer body 30 includes at least one a preferably a plurality of tabs 62 each extending radially-outwardly from the body 30 and disposeable or disposed within a separate slotted opening 60 to couple the body with the housing 16. Each housing slotted opening 60 extends both radially-outwardly from the bore inner surface 17 and partially circumferentially about the central axis $A_C$ and has opposing circumferential ends 61A, 61B. Each retainer tab 62 is generally arcuate and extends both radially-outwardly from the annular body outer end 30b and has opposing circumferential ends 62a, 62b. Further, each retainer tab 62 has a circumferential length (not indicated) approximately equal to, but preferably slightly lesser than, the circumferential length (not indicated) of the associated housing opening 60. As such, the retainer tab ends 62a, 62b are disposed against the adjacent opening ends 60a, 60b, respectively, to prevent angular displacement of the retainer body 30 in either angular direction $D_1$, $D_2$.

Figure 13:
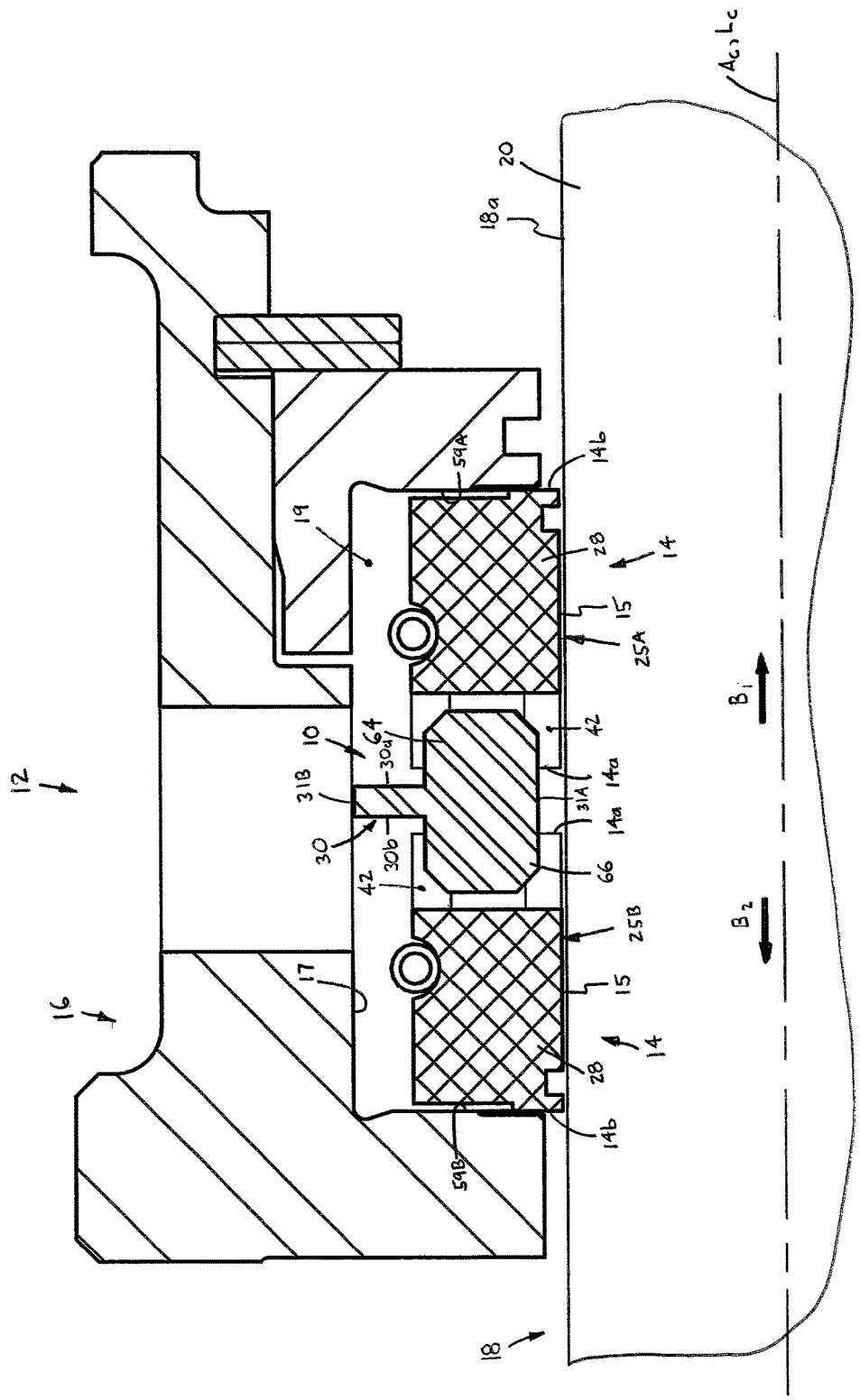
FIG. 13 is an axial cross-sectional view of a mechanical assembly including a retainer device of the present invention in accordance with a second construction, shown with two lugs engaged with a tandem seal assembly.
Figure 14:
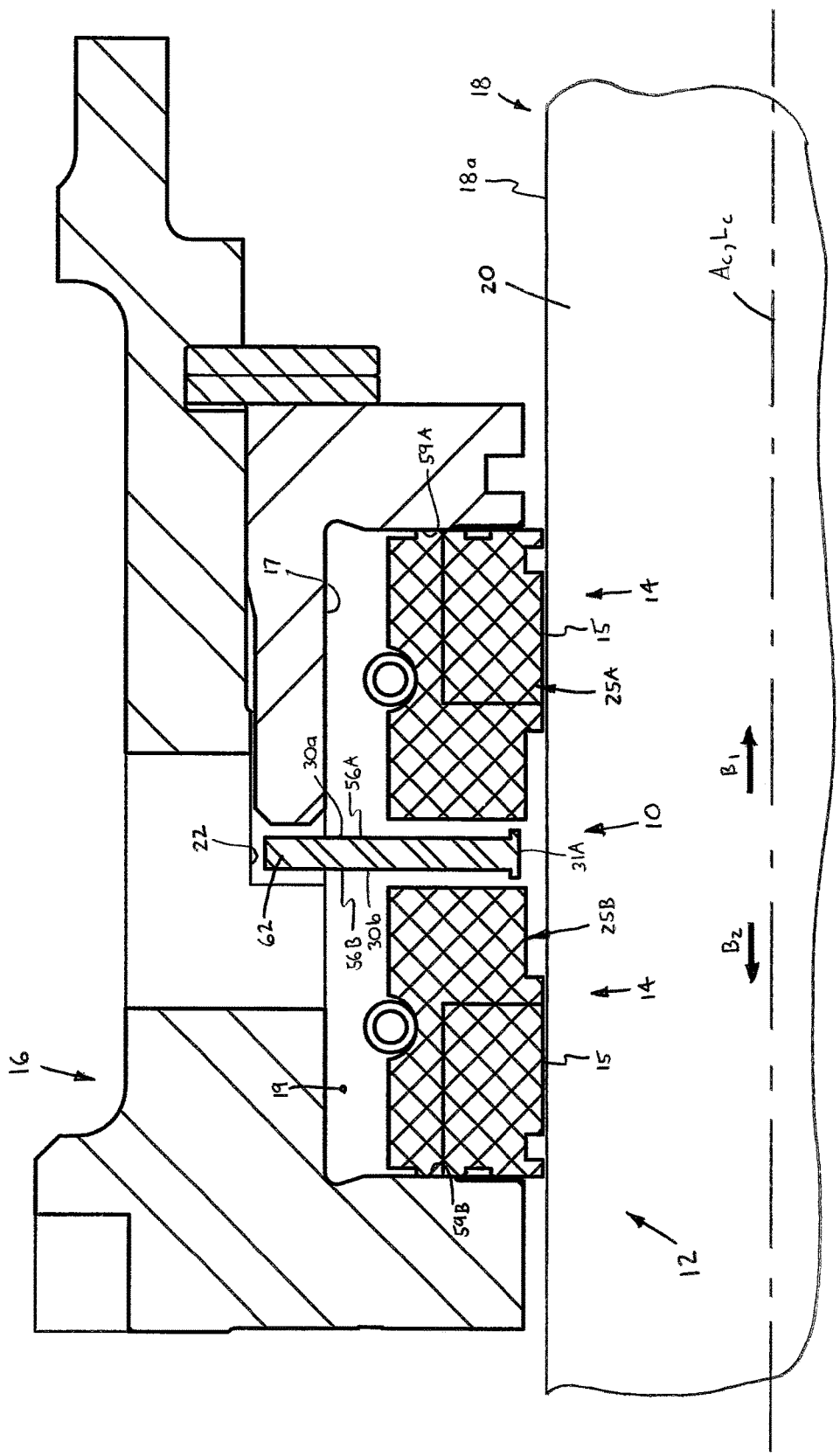
FIG. 14 is another axial cross-sectional view of the mechanical assembly with the second construction retainer device, shown with a retainer tab engaging the housing.
Figure 15:
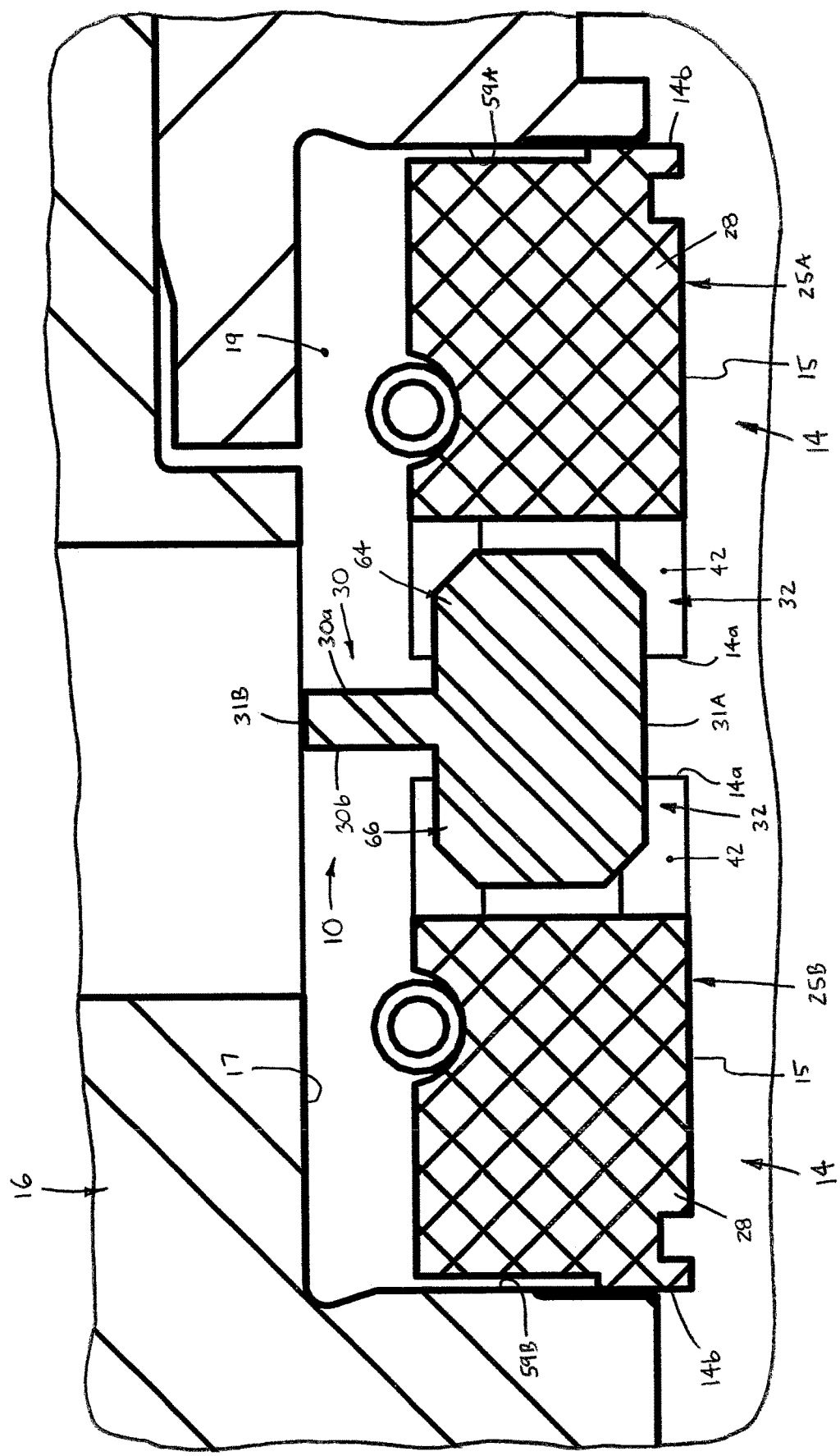
FIG. 15 is an enlarged view of a portion of FIG. 13.
Figure 16:
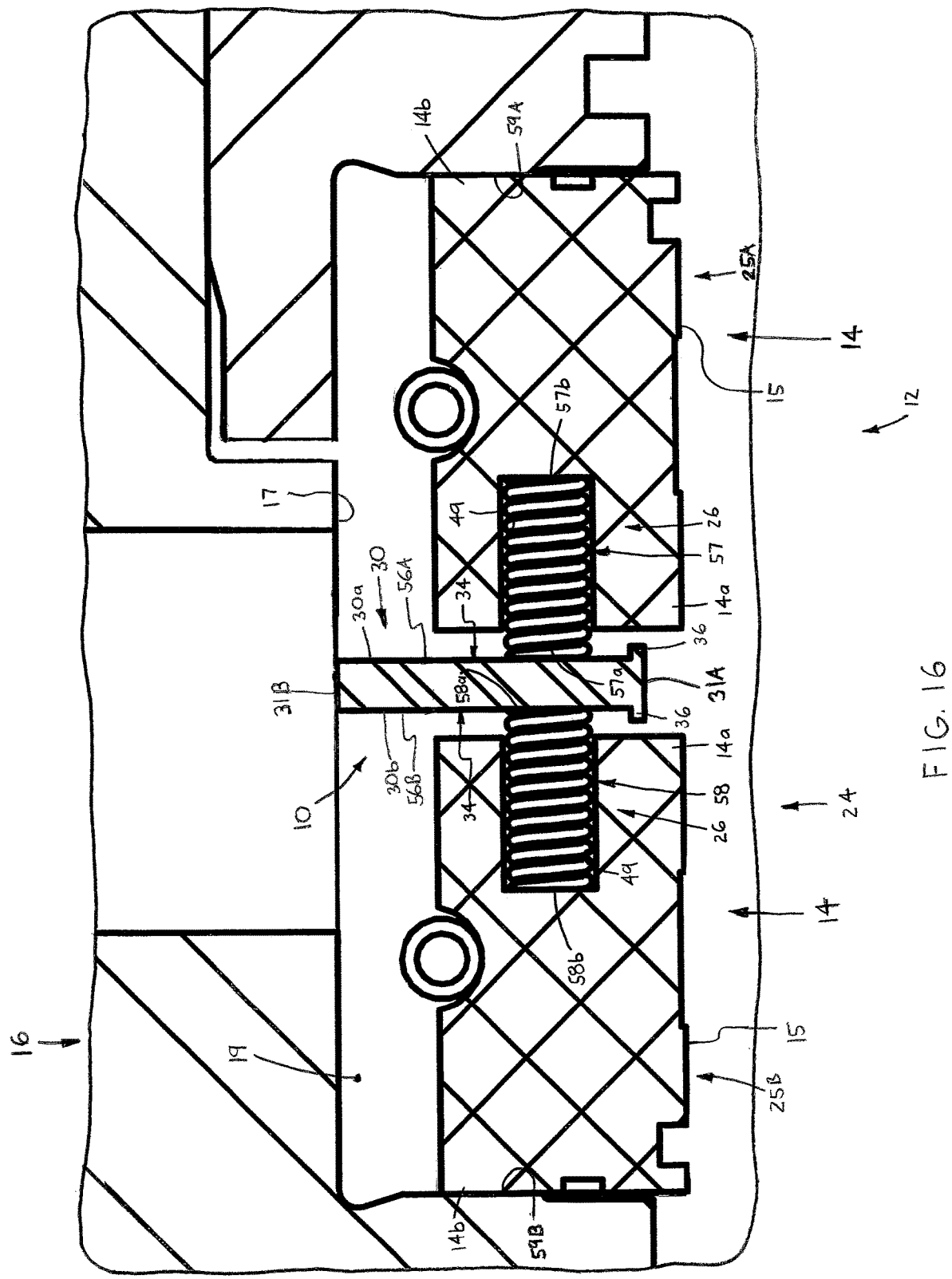
FIG. 16 is an enlarged axial cross-sectional view of the mechanical assembly with second construction retainer device, shown with two springs engaged with the device.
Figure 17:
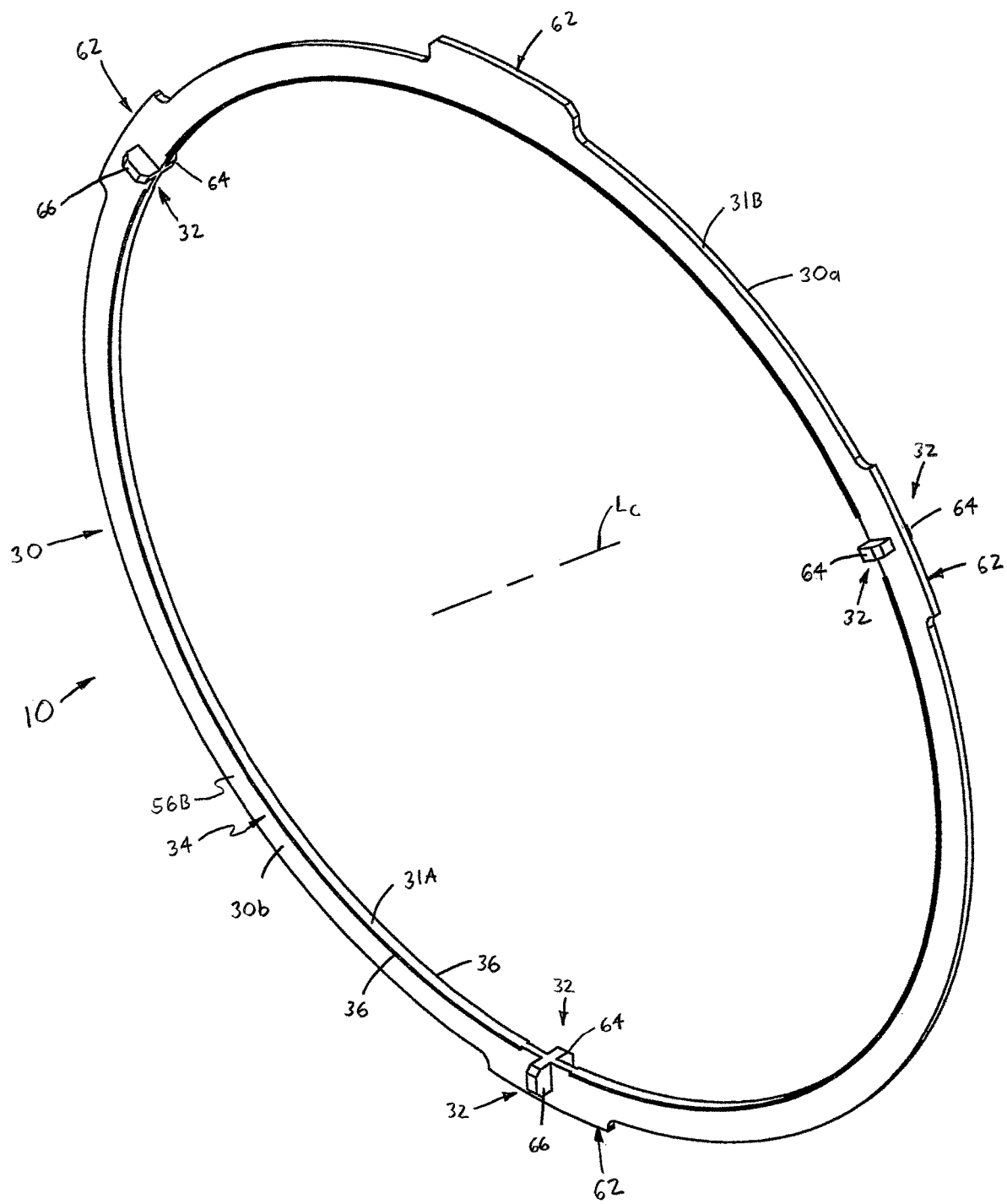
FIG. 17 is a perspective view of the second construction retainer device.

Referring now to FIGS. 13, 15 and 28, with the tandem seal assembly 24, the first seal 25A includes at least one and preferably a plurality of coupler openings 42 extending axially inwardly from the seal second axial end 14b and the second seal 25B also includes at least one and preferably a plurality of coupler openings 42 extending axially inwardly from the seal first axial end 14a. The coupler openings 42 in the tandem seal assembly are preferably formed at least generally as described above with the single seal assembly 23. Further, the retainer device 10 includes at least one and preferably a plurality of first lugs 64 extending in the first axial direction $B_1$ and at least one and preferably a plurality of second lugs 66 extending in the opposing, second axial direction $B_2$.

Specifically, each first lug 64 extends axially outwardly from the body first axial end 30a and is engaged or engageable with one of the coupler openings 42 of the first annular seal 25A to prevent angular displacement of the first seal 25A. Similarly, each one of the second lugs 66 extends axially outwardly from the body second axial end 30b and is engaged/engageable with one of the coupler openings 42 of the second annular seal 25B to prevent angular displacement of the second seal 25B. Further, the lugs 32 are preferably arranged in pairs of first and second lugs 64, 66 with each first lug 64 being substantially axially aligned with each second lug 66, and vice-versa. Such arrangement of the lugs 64, 66 is for the purpose of facilitating fabrication of the retainer device 10, and the first and second lugs 64, 66 may alternatively be "staggered" with respect to each other about the circumference of the body 30.

Although the retainer device 10 used with a single seal assembly 23 (FIGS. 1-12) has lugs 32 engageable with the housing 16 and the retainer device 10 used with a tandem seal assembly 24 (FIGS. 13-23) has one or more tabs 62 engageable with the housing 16, the retainer body 30 used with a single seal 14 may alternatively be formed with arcuate retainers that engage with the housing (similar to tabs 62) or/and the retainer device 10 used with a tandem seal assembly 24 may have one or more lugs 32 engageable with the housing 16 as with the single seal 23.

The retainer device 10 of the present invention has a number of advantages over previously known components or devices for preventing rotation of circumferential seals. The retainer device 10 enables better control over the rotation lock alignment and position and eliminates the need for a rotation lock pin that must be fit to and installed within the housing 16. The use of such lock pins requires axially-directed machining that is typically more difficult in comparison with radial machining operations, particularly when performed within a central portion of a housing. Also, the retainer device 10 simplifies masking tooling required for hard coating of the housing radial sealing surface(s) 27 or 59A, 59B and increases the total surface area of the surface(s) 27 or 59A, 59B.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

I claim:

1. A mechanical assembly comprising:
    a housing having a central bore;
    an inner member disposed within the bore and rotatable about a central axis;
    at least one generally annular seal disposed within the housing bore and about the inner member;
    at least one spring configured to bias the at least one seal generally along the axis; and
    a retainer device including a generally annular plate having a centerline, an inner radial end, an outer radial end and a planar surface extending between the inner radial end and the outer radial end and being disposed within the housing bore so as to be spaced entirely axially apart from the at least one seal such that a gap is defined between the at least one seal and the planar surface of the plate, the plate being coupled with the housing such that the plate is generally nonrotatable about the central axis and including at least one retainer lug extending at least generally axially from the planar surface of the plate, the lug being engaged with the seal to prevent angular displacement of the seal about the axis, the planar surface providing at least one generally radially-extending spring contact surface contacted by an end of the at least one spring such that the spring biases the seal axially away from the retainer plate in a first direction along the axis.

2. The mechanical assembly as recited in claim 1 wherein the at least one spring includes a plurality of springs spaced circumferentially about the central axis, each one of the springs extending between the retainer plate spring contact surface and the at least one seal.

3. The mechanical assembly as recited in claim 1 wherein the retainer annular plate has at least one spring retainer lip extending axially outwardly from the spring contact surface and located generally adjacent to the body inner radial end.

4. The mechanical assembly as recited in claim 1 wherein the annular plate has a plurality of retainer lugs spaced circumferentially about the centerline.

5. The mechanical assembly as recited in claim 1 wherein:
the housing has an inner surface defining the bore and at least one opening extending radially-outwardly from the bore inner surface; and
the at least one retainer lug has an outer radial end disposeable within the housing opening to couple the plate with the housing.

6. The mechanical assembly as recited in claim 1 wherein the at least one retainer lug has at least one generally radially extending retention surface contactable by the at least one seal to prevent angular displacement of the seal about the central axis.

7. The mechanical assembly as recited in claim 6 wherein:
the at least one seal has opposing axial ends, at least one coupler opening extending generally axially from one of the seal axial ends, the coupler opening being defined at least partially by a radial surface; and
the at least one retainer lug is disposed within the seal coupler opening such that the lug radial surface contacts the seal opening radial surface.

8. The mechanical assembly as recited in claim 7 wherein:
at least one seal includes a plurality of generally arcuate seal segments, each seal segment having two opposing ends each coupled with a separate end of each adjacent segment, each segment having at least one coupler opening; and
the retainer includes a plurality of the lugs each extending form the annular plate and spaced circumferentially about the plate centerline, each retainer lug being disposeable within a separate one of the coupler openings of the seal segments.

* * * * *